Figure 1:
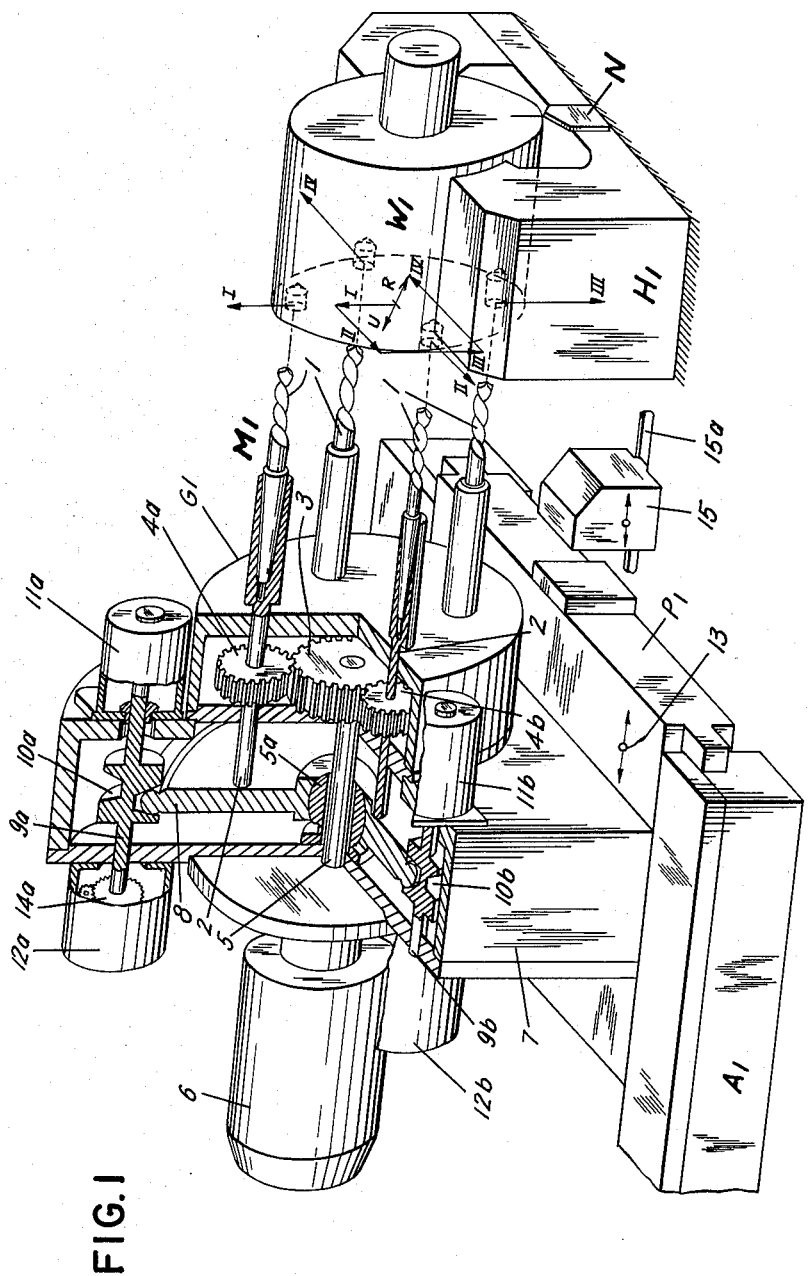

July 12, 1966   G. OBMANN   3,260,137
DEVICE FOR UNBALANCE CORRECTION OF ROTORS
Filed June 18, 1964   2 Sheets-Sheet 1

July 12, 1966  G. OBMANN  3,260,137
DEVICE FOR UNBALANCE CORRECTION OF ROTORS
Filed June 18, 1964  2 Sheets-Sheet 2

United States Patent Office 3,260,137
Patented July 12, 1966

3,260,137
DEVICE FOR UNBALANCE CORRECTION OF ROTORS
Georg Obmann, Gross-Zimmern, Germany, assignor to Carl Schenck Maschinenfabrik G.m.b.H., Darmstadt, Germany, a corporation of Germany
Filed June 18, 1964, Ser. No. 376,090
Claims priority, application Germany, June 26, 1963, Sch 33,460
10 Claims. (Cl. 77—5)

My invention relates to machine-tool devices for correcting mass unbalance of rotating workpieces.

Any unbalance of such workpieces can be determined on balancing machines by measuring at least two unbalance components that are jointly indicative of the amount of unbalance and angular position of the unbalance gravity center with respect to a given correction plane.

As a rule, the two components thus determined are related to a reference system of Cartesian coordinates. However, in cases where it is difficult or unfavorable to measure or correct the unbalance on a rotor in such coordinate directions, the magnitude and angular position of the unbalance can be determined by the so-called polar measuring method with reference to a marker on the workpiece, the subsequent unbalance correction being analogously effected in accordance with the measuring results.

It is an object of my invention to provide fabricating equipment, preferably machine tools, with means for controlling the unbalance correcting operation of the workpiece in accordance with measuring magnitudes previously determined on a balancing machine in any desired manner, while assuring a relatively fine adjustment of the tool controlling devices and a particularly high reliability of performance with respect to accuracy at greatly minimized attendance requirements.

Another object in conjunction with the one just mentioned is to provide unbalance correcting machinery which particularly lends itself to fully automatic operation.

To achieve these ends, and in accordance with one of the features of my invention, I provide an unbalance correcting machine or machine tool with a control member which is positionally adjustable from a normally occupied position and is arrested in the proper position depending upon the results of the preceding unbalance measuring operations as may be performed on any available balancing machine. That is, if the balance measuring operation indicates that the workpiece is not affected by unbalance, the member remains securely held in its normal position, but when the measuring operation yields positive results, the control member is adjusted accordingly and then remains securely held in the adjusted displacement position. Each correction tool of the machine is adjustable with respect to the amount of material added to, or removed from, the workpiece, and is coupled directly or through intermediate transmission structure with the control member, with the result that each tool during its machining or fabricating operation on the workpiece will change the amount of material at the working location in accordance with the measuring magnitudes previously determined. Thus for example, when the workpiece is being balance-corrected by means of several drills which are distributed about the rotor axis of the workpiece, the advance of the respective drill bits depends upon the adjusted displacement of the control member so that the drill bits may penetrate into the workpiece to respectively different depths as required for establishing mass balance.

Figure 2:
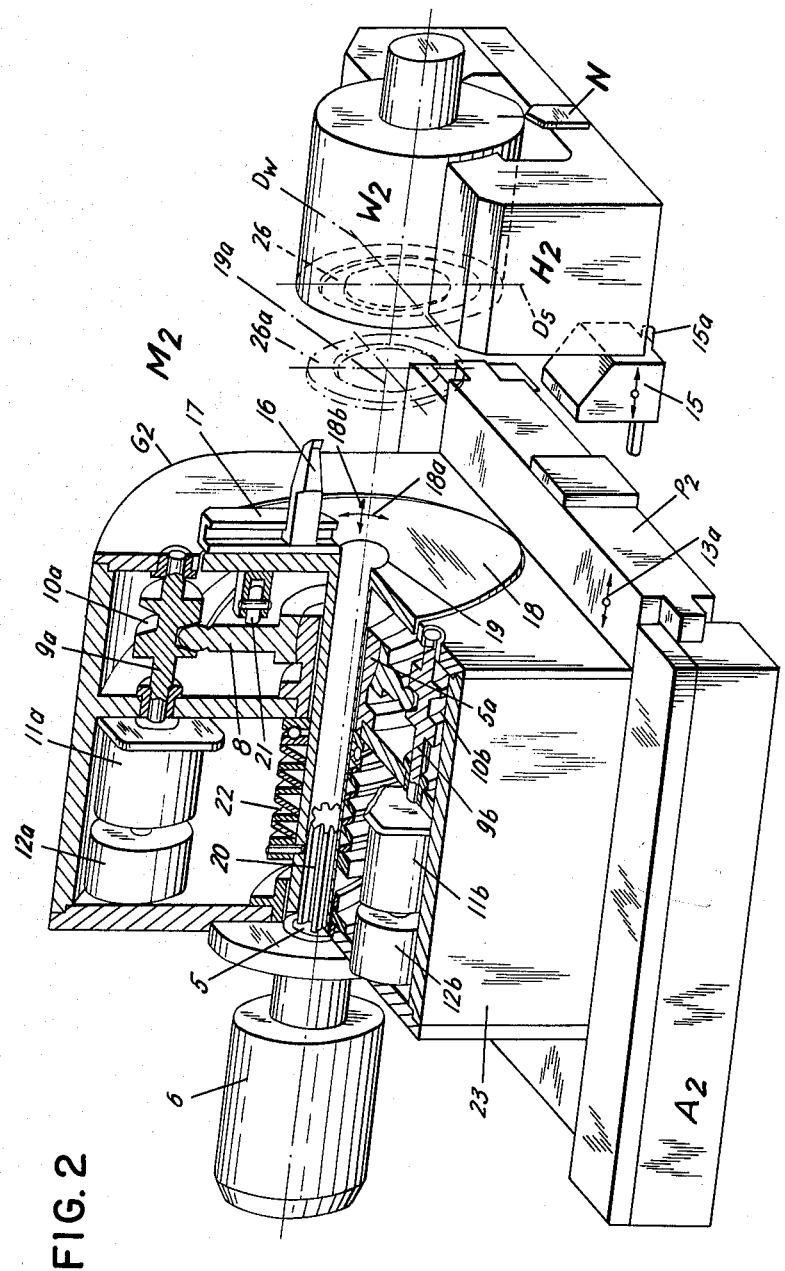

The above-mentioned and more specific objects, advantages and features of my invention, said features being set forth with particularity in the claims annexed hereto, will be apparent from the following description in conjunction with the embodiments of unbalance correcting machine-tool devices illustrated by way of example on the accompanying drawings in which:

FIG. 1 shows perspectively and partly in section a balance-correcting machine tool of the multiple-drill type; and FIG. 2 shows in a corresponding manner a balance-correcting machine tool of the lathe type.

The same reference characters are applied in both illustrations for corresponding components respectively.

According to FIG. 1 the balance-correcting machine $M_1$ has its base plate $P_1$ displaceably mounted on a bed structure $A_1$, the direction of displacement being indicated by a double-headed arrow 13. The machine $M_1$ is equipped with four drilling tools 1. Mounted opposite the machine $M_1$ in alignment with the advancing direction is a rigid and fixed supporting structure $H_1$ for the rotor workpiece $W_1$ which is to be machined by the four drills for the purpose of correcting any previously measured unbalance.

The housing $G_1$ of the machine $M_1$ is shown partly cut open in order to expose a control member 8 and an appertaining adjusting device 10a as well as the drive for the drilling tools. The drill bits are firmly secured in holders 2 which are driven from a motor 6 through a shaft 5 and a spur-gear transmission of which only the gear 3 on the motor shaft 5 and two drill-drive gears 4a and 4b are visible.

The control member 8 and the appertaining adjusting device are located in the portion 7 of the machine housing $G_1$ and operate in such a manner that each drill 1 removes at its working location from the workpiece the particular quantity of material that corresponds to the previously measured respective unbalance magnitudes. The control member 8 is formed by a tiltable circular disc 8 of rigid construction which, in each adjusted position, provides a rigid abutment for the adjacent ends of the respective drilling tool holders 2. The control disc 8 is firmly held in position and also positionally adjusted, i.e., tilted, by means of worms 10a, 10b mounted on respective shafts 9a, 9b and engaged by the bulging peripheral portion of the control disc 8 so that the disc is firmly guided by the worms.

Before the workpiece $W_1$ is mounted on the support $H_1$, its unbalance is analyzed in a balancing machine. As a rule, the unbalance is measured with respect to its horizontal and vertical components relative to a predetermined zero point at the workpiece. The resulting measuring values are then translated into equivalent electric voltages which control corresponding control motors 11a (vertical direction) and 11b (horizontal direction) to turn the appertaining shafts 9a, 9b and their respective worms 10a, 10b. This causes the control disc 8 to be tilted to a corresponding position. To permit such tilting displacement, the disc 8 is seated on a spherical bearing 5a coaxially mounted on the shaft 5 of the drive motor 6. If no unbalance is found to exist, no electric control voltage is available so that no tilting movement away from the illustrated normal position of the disc 8 takes place.

The bearing shell 5a is loosely seated on the drive shaft 5 but is held in position by being secured to a cover portion of the housing $G_1$. The tools 1 and their respective holders 2 are axially displaceable in the housing $G_1$. If desired, springs (not shown) may be mounted on the tool assemblies for continuously holding the tools in engagement with the control disc 8. In any event, however, the tool holders 2 are forced against the control disc 8 by the pressure obtaining against the tools 1 during the machining of the workpiece, thus assuming the position shown in FIG. 1 relative to the disc 8. The drilling depth for each individual tool is determined by the particular tilting position to which the control disc 8 is set. Consequently, the quantity of material which each tool removes from the corresponding machining location in the correction plane of the workpiece is also fixed by the previous adjustment of the control plate 8.

Mounted on the housing $G_1$ are two casing 12a and 12b which contain respective pulse switches 14a or other devices for producing electrical or other signals under control by the rotation of the worm shafts 9a and 9b respectively. The number of the pulses or signals thus issued is proportional to the total amount of rotation of each worm. The pulses control the number of rotations which each worm shaft 9a, 9b must perform in order to place the control disc 8 into the proper tilting position at which the angle between the zero position and the adjusted position is accurately proportional to the unbalance magnitude to be corrected. Such automatic and pulse-responsive control devices for unbalance correction are known per se and since their particular design and operation are not essential to the invention proper, they are not further described herein. If desired, however, reference may be had to the German Patent No. 971,501 or to U.S. Patents 2,682,046 and 2,810,307. According to the above-cited U.S. patents the vertical and horizontal unbalance components measured on a balancing machine are converted to digital magnitudes which are memorized in a storer or counter, and the signals issuing from the aforementioned pulse transmitters 14a reset the respective counters back to zero, with the result that the worm shafts 10a, 10b rotate only from the beginning to the end of the resetting interval, the control motors 11a and 11b running at constant speed so that the worm rotation is proportional to the memorized count.

After the tools 1 are placed into the proper positions with the aid of the control disc 8 as described above, the machine $M_1$ is moved on its bed structure $A_1$ toward the workpiece for performing the correcting operation. Mounted between the base plate $P_1$ of the machine and the supporting structure $H_1$ for the workpiece is an adjustable abutment block 15 which can be displaced, as indicated by the associated double-headed arrow along a slot 15a of the bed structure and can be rigidly fastened in the adjusted position. The front face on the left side of the workpiece $W_1$, facing the drill bits, constitutes the correction plane. The drive motor 6 is switched on before the drill bits reach this correction plane. Consequently, all of the drills are in operative condition prior to arriving at the workpiece. Depending upon the setting of the drills determined by the position of the control plate 8, the drill bits produce a shallower or deeper hole in the workpiece, until the base plate $P_1$ reaches the abutment block 15 which terminates the further forward feed of the drill and hence the further machining of the workpiece. The drive motor 6 is then switched off preferably by a switch (not shown) in the abutment block 15 actuated by engagement with the base plate $P_1$. The abutment block 15 is set to a fixed distance from the supporting structure $H_1$, which may have a different structure for different types or series of workpieces to be balance corrected.

The lathe-type machine tool shown in FIG. 2 permits correcting the unbalance of a rotor workpiece $W_2$, by means of a cutting or facing tool 16. Since those components that structurally and functionally correspond to those of the embodiment according to FIG. 1, are denoted by the same respective reference characters, a repetition of their description can be dispensed with.

The cutting tool 16 is mounted on a holder 17 which is displaceable on a disc-shaped flange 18 mounted on the main shaft 19. The eccentricity of the tool and hence of its active tip relative to the axis of shaft 19 is adjustable. The shaft 19 is coaxially connected with the shaft of the drive motor 6 through a multiple key connection so as to be axially displaceable with respect to the machine housing $G_2$. A spring or spring assembly 22 coaxially seated on shaft 19 in the housing $G_2$, biases the shaft and the flange 18 toward the motor 6 so that a follower roller 21 journalled on the flange 18 is always in rolling contact with the tiltable control disc 8. The disc 8 is tiltably mounted on a spherical bearing shell 5a and is held in normal position or in an adjusted tilted position in the same manner and by the same means as described above with reference to FIG. 1. The components 11a, 11b and 12a, 12b in FIG. 2, although differently arranged, correspond to the corresponding control components denoted by the same respective characters in FIG. 1.

The machine operation also takes place in analogy with the one described above with reference to FIG. 1, with the exception of the different type of turning tool 16 and its machining motion. The curved double-headed arrow 18a in FIG. 2 indicates the turning motion, and the straight double-headed arrow 18b the axial displacement of the shaft 19 with the flange 18 and the tool 16. The housing $G_2$ is fastened on the base plate $P_2$ whose feed motion toward the workpiece is limited by an adjustable abutment block 15. The workpiece $W_2$ is mounted on a support $H_2$. During operation, the cutting tool 16 enters into the correction plane here constituted by the front face of the workpiece, and produces the groove 26 concentric to the rotor axis of the workpiece. The groove has a different depth at different circumferential localities so that the maximal depth is located 180° from the minimal depth. This is a consequence of the tilted position to which the control disc 8 may be adjusted. As the cutting tool 16 rotates about the axis 19a of the shaft 19, the follower roller 21 rolls on the then stationary disc 18 and thereby controls the varying feed travel of the tool tip during the machining operation, in analogy to the operations described and explained above with reference to FIG. 1. The difference between the quantity of material cut from the workpiece above and below the horizontal diameter $D_w$ respectively is proportional to the measured unbalance magnitude.

Following is a summary of performance in machines constructed according to the invention.

After rotor workpiece $W_1$ or $W_2$ has been measured with respect to the magnitude and location of its unbalance, it is placed on the support $H_1$ of machine $M_1$ or on the support $H_2$ of machine $M_2$, where the workpiece is immovably clamped in a zero position determined by the unbalance measuring operation that has provided a marking on the workpiece, which is suitably aligned with an index N. Up to this point, the operation is in accordance with the generally customary or conventional operation. The machine is then put in operation as described above. As the base plate ($P_1$ in FIG. 1) advances toward the workpiece, all of the drills operate almost simultaneously on the front side of the workpiece but, by virtue of the control effected with the aid of the disc 8, penetrate to respectively different depths. The quantities of material removed are represented in FIG. 1 by the bore holes I, II, III and IV corresponding to respective 90° components. The magnitude and direction of the unbalance vectors relative to each hole are given by the product $u \cdot r$ wherein $u$ denotes the quantity of material drilled away, and $r$ denotes the radial distance from the rotor axis of the workpiece. The geometric addition of the four vectors shows that the resultant vector R is equal and opposite to the unbalance vector U, thus eliminating the unbalance. This result is independent of the feed travel of the drills as long as a minimum depth of the bore holes is secured. If desired, however, more or less than four drilling tools or other machining tools may be employed, for example in order to perform a balance correcting operation in 60° components. It is preferable but not necessary to distribute the tools uniformly along the periphery of the workpiece surface to be machined. This applies to the embodiment exemplified in FIG. 1.

A machine of the type shown in FIG. 2 is suitable for the balance correction on workpieces which offer only given localities along the workpiece periphery for correction purposes. The use of such machines is advisable for workpieces that normally exhibit large amounts of unbalance but which require only a slight alteration of its material, as is the case for example with shunt rings of electric motors. The removal of ring-shaped amount of material schematically shown at 26A in FIG. 2 causes the gravity center to be displaced in the workpiece $W_2$, the displacement corresponding to the magnitude and direction of the measured unbalance. The difference of the quantities of material in the two half-portions of the ring is essential to the effect thus obtained. Differences in length of the workpieces or in the condition of the tool cutting edges do not have any effect on the result, this being also the case with machines of the type shown in FIG. 1.

It will be understood that machine-tool devices according to the invention afford a fully automatic performance of unbalance-correcting operations. The possibilities of error or machining faults are thus greatly limited. Small as well as large amounts of unbalance can be compensated by removing material with the aid of chip-forming tools. More complicated correction methods, such as riveting of discs on specially provided bosses, an expedient heretofore often employed are rendered entirely superfluous.

It will be further understood from the foregoing description of the illustrated embodiment, that the tools provided for unbalance correction, for example drills for removing material, can also be placed in any selected combination, for example pairwise, into machining engagement with the workpiece so that the correction produced by the combined group of tools corresponds to the magnitude of the measured unbalance. In this manner, the correcting operation for a particular workpiece or series of similar workpieces, can be limited by means of a fixed stop or abutment which limits the feed travel of the machining tool or tools.

To those skilled in the art it will be obvious upon a study of this disclosure that my invention permits of various other modifications and hence can be given embodiments other than particularly illustrated and described herein, without departing from the essential features of my invention, and within the scope of the claims annexed hereto.

I claim:

1. A machine for correcting previously measured unbalance of a rotor workpiece, comprising a support for a rotor workpiece having an axis, tool means displaceable toward said support in a direction parallel to the axis of the workpiece for balance correction of the workpiece on said support, a disc-shaped tool control member displaceable from a normal position in which it is coaxial with the workpiece, control means engageable with said member for setting and fixing said member in respectively different positions in dependence upon the measured unbalance, and means engaging said tool means with said tool control member for placing said tool means into tooling engagement with the workpiece so that the change of workpiece material effected by said tool means is in accordance with said measured unbalance.

2. A machine for correcting previously measured unbalance of a rotor workpiece, comprising a workpiece support; a machining unit having a mounting structure and tool means axially displaceable on said structure toward said support for balance-correcting machining of a workpiece on said support; a disc-shaped tool control member mounted on said support in coaxial relation to the geometric workpiece axis of said support and being tiltable about a point of said axis; control means engageable with said member for setting and fixing said member in respectively different positions in dependence upon the measured unbalance, and means engaging said tool means with said tool control member, whereby the change of workpiece material effected by said tool means is in accordance with said measured unbalance.

3. A machine for correcting previously measured unbalance of a rotor workpiece, comprising a workpiece support; a machining unit having a mounting structure, a tool drive shaft journalled on said structure in coaxial relation to the axis of a workpiece on said support, and tool means radially spaced from said axis on said structure and movable toward said support for balance-correcting operation on the workpiece; a disc-shaped tool control member mounted on said support in coaxial relation to said drive shaft and tiltable about a fixed point of said axis, control means engageable with said member for setting and fixing said member in respectively different positions in dependence upon the measured unbalance, and means engaging said tool means with said tool control member, whereby the change of workpiece material effected by said tool means is in accordance with said measured unbalance.

4. A machine for correcting previously measured unbalance of a rotor workpiece, comprising a workpiece support; a machining unit having a mounting structure, a tool driveshaft journalled on said structure in coaxial relation to the axis of a workpiece on said support, and a plurality of machining tools displaceably mounted on said structure for movement parallel to said axis toward said support and connected with said shaft to be driven therefrom to perform correcting operations on the workpiece; a disc-shaped tool control member mounted on said support in coaxial relation to said drive shaft and tiltable about a fixed point of said axis, control means engageable with said member for setting and fixing said member in respectively different positions of tilt in dependence upon the measured unbalance; said tools being arranged about said axis and having means engageable with said tool control member, whereby the change of workpiece material effected by said tools is in accordance with the measured unbalance.

5. A machine for correcting previously measured unbalance of a rotor workpiece, comprising a workpiece support; a machining unit having a mounting structure, a tool drive shaft journalled on said structure in coaxial relation to the axis of a workpiece on said support, and a cutting tool connected with said shaft to rotate together therewith and being radially spaced from said axis, said tool being movable toward said support for balance-correcting operation on the workpiece; a disc-shaped tool control member mounted on said support in coaxial relation to said drive shaft and tiltable about a fixed point of said axis, control means engageable with said member for setting and fixing said member in respectively different positions in dependence upon the measured unbalance, and means engaging said tool means with said tool control member, whereby the change of workpiece material effected by said tool means is in accordance with said measured unbalance.

6. In an unbalance-correcting machine according to claim 2, said mounting structure being displaceable toward said workpiece support for moving said tools into working ranges, an abutment between said workpiece support and said mounting structure and engageable by said structure for limiting the penetrating depth of said tool means in the workpiece, said abutment being positionally adjustable for setting the depth limits.

7. In an unbalance-correcting machine according to claim 1, said control means comprising two individually operable adjusting devices engageable with said tool control member and having respective different and coordinately corrected adjusting directions corresponding to coordinately measured unbalance components of the workpiece to be corrected, whereby the displacement of said control member from its normal position is jointly effected by said two adjusting devices.

8. An unbalance-correcting machine according to claim 3, comprising an externally spherical bearing shell seated on said drive shaft and secured to said structure in a fixed position relative to the shaft axis, said disc-shaped tool control member being tiltably seated on said bearing shell, said control means comprising two individually operable adjusting devices engageable with said tool control member at peripheral points spaced 90° apart and having respective member-adjusting directions parallel to said axis, whereby the tilting displacement of said control member from its normal position is jointly effected by said two adjusting devices.

9. In an unbalance-correcting machine according to claim 8, each of said two adjusting devices having a controllably revolvable shaft and a worm thereon, said worm having helical turns engaging and fixing said disc-shaped tool control member at the periphery thereof.

10. In an unbalance-correcting machine according to claim 3, said machining unit having a horizontal base plate which is horizontally displaceable toward said workpiece support, and an abutment between said workpiece support and said base plate and engageable by said plate for limiting the penetrating depth of said tool means in the workpiece, said abutment being positionally adjustable for setting the depth limits.

References Cited by the Examiner

UNITED STATES PATENTS

| 2,235,393 | 3/1941 | Baker | 77—5 |
| 2,731,887 | 1/1956 | Sjostrand | 73—66 X |

WILLIAM W. DYER, Jr., *Primary Examiner.*

FRANCIS S. HUSAR, *Examiner.*